United States Patent
Tada et al.

(10) Patent No.: US 7,674,854 B2
(45) Date of Patent: Mar. 9, 2010

(54) PROCESS FOR PRODUCING POLYVINYL ACETAL RESIN, POLYVINYL BUTYRAL RESIN, AND PROCESS FOR PRODUCING ESTERIFIED POLYVINYL ALCOHOL RESIN

(75) Inventors: Toshio Tada, Hyogo (JP); Yohei Nishimura, Osaka (JP); Katsunori Toyoshima, Osaka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 250 days.

(21) Appl. No.: 11/659,130

(22) PCT Filed: Aug. 4, 2004

(86) PCT No.: PCT/JP2004/011176

§ 371 (c)(1),
(2), (4) Date: Jun. 6, 2007

(87) PCT Pub. No.: WO2006/013627

PCT Pub. Date: Feb. 9, 2006

(65) Prior Publication Data

US 2007/0293651 A1    Dec. 20, 2007

(51) Int. Cl.
C08C 2/04 (2006.01)
C08F 8/00 (2006.01)

(52) U.S. Cl. ............... 525/61; 525/56; 525/57; 525/59; 525/342; 525/343; 525/353; 525/371; 525/372; 528/482; 528/490; 528/499

(58) Field of Classification Search ........... 525/56, 525/57, 59, 61, 342, 343, 353, 371, 372; 528/482, 499, 490
See application file for complete search history.

(56) References Cited

U.S. PATENT DOCUMENTS

| 2,265,255 | A | * | 12/1941 | Stamatoff | ............ 525/61 |
| 5,594,069 | A | * | 1/1997 | David et al. | ............ 525/61 |
| 5,807,657 | A | * | 9/1998 | Kikuchi et al. | ............ 430/287.1 |
| 5,866,654 | A | | 2/1999 | Fuss et al. | |
| 6,277,750 | B1 | | 8/2001 | Pawlowski et al. | |
| 6,586,103 | B2 | * | 7/2003 | Shohi et al. | ............ 428/437 |

FOREIGN PATENT DOCUMENTS

| CA | 2 462 949 | | 4/2003 |
| DE | 10122613 C1 | * | 9/2002 |
| EP | 0 140 531 | | 8/1984 |
| EP | 0 140 531 | | 5/1985 |
| JP | 58057406 A | * | 4/1983 |
| JP | 60-79011 | | 5/1985 |
| JP | 6-1853 | | 1/1994 |
| JP | 8-505163 | | 6/1996 |
| JP | 8-325518 | | 12/1996 |
| JP | 11-49871 | | 2/1999 |
| JP | 11-349629 | | 12/1999 |
| JP | 2005-2284 | | 1/2005 |
| WO | 94/13710 | | 6/1994 |
| WO | 00/03303 | | 1/2000 |

OTHER PUBLICATIONS

International Search Report issued Jan. 30, 2008 in the International (PCT) Application of which the present application is the U.S. National Stage.
Chemical abstracts 1965:44384, XP 002466771 (for JP 39-017064 B).
Chemical abstracts 1973:537679, XP 002466772 (for JP 48-006195 B).
Supplementary European Search Report issued Jan. 30, 2008 in the corresponding EP application.

* cited by examiner

*Primary Examiner*—David Wu
*Assistant Examiner*—Marie Reddick
(74) *Attorney, Agent, or Firm*—Wenderoth, Lind & Ponack, L.L.P.

(57) ABSTRACT

It is an object of the present invention to provide a method of producing a polyvinyl acetal resin by which a polyvinyl acetal resin having a high acetalization degree can be produced even in a solid catalyst system, a polyvinyl butyral resin produced by the above-mentioned production method of a polyvinyl acetal resin, and a method of producing an esterified polyvinyl alcohol resin by which the esterification can be performed at high efficiency even in a solid catalyst system.

The present invention is a method of producing a polyvinyl acetal resin, wherein a solution or a suspension containing a polyvinyl alcohol resin and a carbonyl compound is pressurized in the presence of a solid catalyst.

11 Claims, No Drawings

US 7,674,854 B2

PROCESS FOR PRODUCING POLYVINYL ACETAL RESIN, POLYVINYL BUTYRAL RESIN, AND PROCESS FOR PRODUCING ESTERIFIED POLYVINYL ALCOHOL RESIN

This application is a U.S. national stage of International Application No. PCT/JP2004/011176 filed Aug. 4, 2004.

TECHNICAL FIELD

The present invention relates to a method of producing a polyvinyl acetal resin by which a polyvinyl acetal resin having a high acetalization degree can be produced even in a solid catalyst system, a polyvinyl butyral resin produced by the above-mentioned production method of a polyvinyl acetal resin, and a method of producing an esterified polyvinyl alcohol resin by which the esterification can be performed at high efficiency even in a solid catalyst system.

BACKGROUND ART

A polyvinyl acetal resin is widely used for many purposes, for example, an interlayer film for a laminated glass, a wash primer of metal treatment, various coating materials, an adhesive, a resin processing agent, a ceramics binder and the like, and in recent years, the range of its applications has been extended to electronic materials. Among others, a polyvinyl butyral resin is particularly suitably used for an interlayer film for a laminated glass and the like because it is superior in a film formation property, transparency, absorbency of impact energy, and adhesion to glass.

The polyvinyl acetal resin is generally produced by dehydrating and condensing a polyvinyl alcohol resin and an aldehyde compound in the presence of an acid catalyst such as hydrochloric acid as shown in Patent Document 1. And, in Patent Document 2, a method of producing a polyvinyl butyral resin in which a polyvinyl alcohol resin and a butyl aldehyde compound are mixed with a given mixing power in the presence of an acid catalyst in an aqueous solution is disclosed.

However, in the conventional method of producing a polyvinyl acetal resin, it is essential to use an acid catalyst. When the polyvinyl acetal resin produced by the conventional production method of a polyvinyl acetal resin is used for the applications of electronic materials in which the presence of impurities may cause serious problems, a process step of neutralizing an acid catalyst is needed and further an extremely troublesome process step of cleaning remaining halogen ions in the resin which have been originated from the acid catalyst, alkaline ions used in neutralization and the like to remove impurities in the resin is needed.

On the other hand, even if it is tried to react polyvinyl alcohol with aldehyde without using an acid catalyst such as hydrochloric acid, only a polyvinyl acetal resin having an acetalization degree of the order, at most, of 40 mol % can be obtained. And, even if it is tried to heat a system to elevated temperatures to accelerate an acetalization reaction, degradation of a resin such as the break of a primary chain occurs and some resins obtained are colored.

And so, a method of producing a polyvinyl acetal resin having an acetalization degree of 70 mol % or more without using an acid catalyst, which can be put to practical use, has been requested.

An esterified polyvinyl alcohol resin also has a wide array of uses. However, there were the same problems as in the method of producing a polyvinyl acetal resin since it is essential to use an acid catalyst in order to esterify a polyvinyl alcohol resin at high efficiency using the conventional method of producing an esterified polyvinyl alcohol resin.

Patent Document 1: Japanese Kokai Publication Hei-6-1853
Patent Document 2: Japanese Kokai Publication Hei-11-349629

DISCLOSURE OF THE INVENTION

Problems Which the Invention is to Solve

In view of the above-mentioned state of the art, it is an object of the present invention to provide a method of producing a polyvinyl acetal resin by which a polyvinyl acetal resin having a high acetalization degree can be produced even in a solid catalyst system, a polyvinyl butyral resin produced by the above-mentioned production method of a polyvinyl acetal resin, and a method of producing an esterified polyvinyl alcohol resin by which the esterification can be performed at high efficiency even in a solid catalyst system.

Means for Solving the Object

The present invention 1 is a method of producing a polyvinyl acetal resin, wherein a solution or a suspension containing a polyvinyl alcohol resin and a carbonyl compound is pressurized in the presence of a solid catalyst.

The present invention 2 is a method of producing an esterified polyvinyl alcohol resin, wherein a solution or a suspension containing a polyvinyl alcohol resin and a carboxylic acid compound is pressurized in the presence of a solid catalyst.

Hereinafter, the present invention will be described in detail.

In the method of producing a polyvinyl acetal resin of the present invention 1, a solution or a suspension containing a polyvinyl alcohol resin and a carbonyl compound is pressurized in the presence of a solid catalyst.

The above-mentioned polyvinyl alcohol resin is not particularly limited, and publicly known polyvinyl alcohol resins, such as compounds produced by saponifying polyvinyl acetate with alkali, acid, ammonia water and the like, can be used.

The above-mentioned polyvinyl alcohol resin may be an alcohol resin completely saponified, but if there is at least one unit having duplex hydroxyl groups relative to a meso position or a raceme position in at least one position in a primary chain, the alcohol resin does not need to be completely saponified and may be a partially saponified polyvinyl alcohol resin.

And, as the above-mentioned polyvinyl alcohol resin, a copolymer of vinyl alcohol and a monomer which is copolymerizable with vinyl alcohol, such as an ethylene-vinyl alcohol copolymer resin, a partially saponified ethylene-vinyl alcohol copolymer resin and the like can be used. Further, a denatured polyvinyl alcohol resin, in which carboxylic acid and the like are partially introduced, can also be used.

As the above-mentioned carbonyl compound, for example, an aldehyde compound and/or a ketone compound are preferable.

The above-mentioned aldehyde compound is not particularly limited and examples of the compound include straight-chain, branched or cyclic saturated, unsaturated or aromatic aldehyde compounds having 1 to 19 carbon atoms. Such an aldehyde compound is not particularly limited and includes, for example, formaldehyde, acetaldehyde, propionylaldehyde, n-butylaldehyde, isobutylaldehyde, t-butylaldehyde, benzaldehyde, cyclohexyl aldehyde and the like. These aldehyde compounds may be used singly or in combination of two or more species. And, each of these aldehyde compounds may be one, of which one or more hydrogen atoms are replaced with halogen and the like.

The above-mentioned ketone compound is not particularly limited and examples of the compound include straight-chain, branched or cyclic saturated, unsaturated or aromatic ketone compounds having 1 to 19 carbon atoms. These ketone compounds may be used singly or in combination of two or more species. And, each of these ketone compounds may be one, of which one or more hydrogen atoms are replaced with halogen and the like.

The above-mentioned aldehyde compound may be used in combination with the above-mentioned ketone compound.

The above-mentioned polyvinyl alcohol resin and a carbonyl compound are subjected to a reaction in a state being dissolved or suspended in a medium.

The above-mentioned medium is not particularly limited but water, alcohols such as methanol, ethanol and isopropanol, or mixtures thereof and the like are suitably used.

In the solution or the suspension containing the above-mentioned polyvinyl alcohol resin and a carbonyl compound, the amount of the carbonyl compound to be mixed to the above-mentioned polyvinyl alcohol resin is not particularly limited, but a preferred lower limit of the amount to be mixed is the same amount as the theoretical reacting amount and a preferred upper limit is 30 times the theoretical reacting amount. When it is less than the same amount as the theoretical reacting amount, the reaction does not proceed, the acetalization degree of the obtained polyvinyl acetal resin may be insufficient, and when the carbonyl compound is mixed in an amount more than 30 times the theoretical reacting amount, this does not contribute to the further enhancement of the acetalization degree and may result in a cost increase. More preferred upper limit is 12 times and furthermore preferred upper limit is 3 times. When the amount of the carbonyl compound to be mixed is too large, there may remain an aldehyde smell. One of the characteristics of the method of producing a polyvinyl acetal resin of the present invention is that depending on the application of a resin and the acetalization degree required, even when the carbonyl compound is mixed in the same amount as the theoretical reacting amount, substantially all of the carbonyl compound can be reacted.

In the solution or the suspension containing the above-mentioned polyvinyl alcohol resin and a carbonyl compound, a preferred lower limit of the hydrogen ion concentration is $10^{-6}$ M and a preferred upper limit is $10^{-3}$ M. When the hydrogen ion concentration is less than $10^{-6}$ M, the reaction hardly proceeds and there may be cases where a polyvinyl acetal resin having a high acetalization degree cannot be obtained, and when it exceeds $10^{-3}$ M, the reaction becomes nonuniform and an intermolecularly crosslinked polyvinyl acetal resin may be produced.

In the method of producing a polyvinyl acetal resin of the present invention 1, the solution or the suspension containing a polyvinyl alcohol resin and a carbonyl compound is pressurized.

The method of pressurizing the solution or the suspension containing the above-mentioned polyvinyl alcohol resin and a carbonyl compound is not particularly limited, but for example, a method of pressurizing using the solution or the suspension itself containing a polyvinyl alcohol resin and a carbonyl compound or a component of the solution or the suspension is suitable. Specifically, there is, for example, a method of sending the solution or the suspension itself containing a polyvinyl alcohol resin and a carbonyl compound or a component of the solution or the suspension to the solution or the suspension containing the above-mentioned polyvinyl alcohol resin and a carbonyl compound in a pressure-resistant container such as an autoclave until reaching a prescribed pressure using a pump and the like.

Examples of the solution or the suspension itself containing the above-mentioned polyvinyl alcohol resin and a carbonyl compound or a component of the solution or the suspension include the solution or the suspension itself as well as its solvent, medium, a carbonyl compound to be a raw material and the like.

And, it is also preferred to pressurize the solution or the suspension containing a polyvinyl alcohol resin and a carbonyl compound using at least one species selected from the group consisting of nitrogen, oxygen, nitrogen oxide, carbon dioxide, helium, argon, neon, water and air other than the above-mentioned solvent.

And, in this case, after sending the solution or the suspension containing a polyvinyl alcohol resin and a carbonyl compound until the solution or the suspension reaches an appropriate pressure, the system pressure may be raised to a prescribed pressure by heating the pressure-resistant container.

The pressure in the case of pressurizing the solution or the suspension containing the above-mentioned polyvinyl alcohol resin and a carbonyl compound is not particularly limited, but it is preferably 0.5 MPa or more. When this pressure is less than 0.5 MPa, the reaction hardly proceeds and there may be cases where a polyvinyl acetal resin having an adequate acetalization degree cannot be not obtained. This pressure is more preferably 4 MPa or more.

In the method of producing a polyvinyl acetal resin of the present invention 1, the solution or the suspension containing the above-mentioned polyvinyl alcohol resin and a carbonyl compound is preferably pressurized at a temperature of 0 to 250° C. When this temperature is less than 0° C., the reaction does not sufficiently proceed and there may be cases where a polyvinyl acetal resin having an adequate acetalization degree cannot be not obtained, and when the temperature is more than 250° C., degradation of a resin such as the break of a primary chain occurs and some resins are colored. More preferred temperature upper limit is 150° C. and furthermore preferred temperature upper limit is 120° C.

In the method of producing a polyvinyl acetal resin of the present invention 1, the solution or the suspension containing a polyvinyl alcohol resin and a carbonyl compound is pressurized in the presence of a solid catalyst.

When such a solid catalyst is used, the obtained polyvinyl acetal resin can be extremely easily separated from the catalyst and burdensome operations such as the neutralization of an acid or cleaning of the obtained resin are unnecessary.

In the conventional method of producing a polyvinyl acetal resin, a polyvinyl acetal resin having an adequate acetalization degree could not be obtained even if using a solid catalyst in place of the usual acid catalyst. The present inventors made earnest investigations, and consequently found that by pressurizing the solution or the suspension containing a polyvinyl alcohol resin and a carbonyl compound in the presence of a solid catalyst, a polyvinyl acetal resin having an adequate acetalization degree can be obtained even if using a solid catalyst in place of the usual acid catalyst.

When a polyvinyl alcohol resin is acetalized with a carbonyl compound, the resin becomes insoluble and heterogeneous and is deposited as the acetalization reaction proceeds. In the resin thus deposited, since a hydroxyl group to be acetalized is confined within the resin, the hydroxyl group cannot further react with a carbonyl compound and in a normal pressure reaction, only an acetalization degree of the order, at most, of 40 mol % can be attained. But, it is thought that by pressurizing, the carbonyl compound comes to be able to penetrate into the interior of the deposited resin and therefore a high acetalization degree which cannot be achieved under a normal pressure can be achieved. In addition, since the resin softens by heating, if the resin is heated when being pressurized, the infiltration of the carbonyl compound into the resin is accelerated by pressuring and a polyvinyl acetal resin having a higher acetalization degree can be obtained.

The above-mentioned solid catalyst is not particularly limited, and examples of the solid catalyst include acid silica, acid alumina, acid zirconia, zeolite; an acid ion resin in which a carboxyl group or a sulfonic acid group is introduced; an acid resin in which a carboxyl group is introduced, and the like.

The above-mentioned acid ion-exchange resin is not particularly limited, but for example, a styrene type resin, a (meth)acrylic type resin or a styrene-(meth)acrylic acid copolymer is suitably used. Such an ion-exchange resin is suitably used because of the ease of regeneration.

The method of pressurizing the solution or the suspension containing a polyvinyl alcohol resin and a carbonyl compound in the presence of the above-mentioned solid catalyst is not particularly limited, and it includes, for example, a method of pressurizing a reaction mixture containing a polyvinyl alcohol resin, a carbonyl compound and a solid catalyst in a pressure-resistant container in the case of a batch type in which the above-mentioned polyvinyl alcohol resin is reacted with a carbonyl compound in a pressure-resistant container. And, in the case of a flow type in which the pressurized polyvinyl alcohol resin and a carbonyl compound are continuously mixed in a reaction equipment, the method of pressurizing includes a method of passing a pressurized mixture of a polyvinyl alcohol resin and a carbonyl compound or a pressurized carbonyl compound through a column packed with a solid catalyst.

Further, when the polyvinyl acetal resin is produced by the flow type, as the location of a column packed with the solid catalyst to be installed, a passage of the carbonyl compound before being mixed with the polyvinyl alcohol resin or a passage of a mixture of the polyvinyl alcohol resin and the carbonyl compound is conceivable, but a location before the mixture is heated is preferred. When the reaction proceeds at once by heating to produce a polyvinyl acetal resin, the produced polyvinyl acetal resin may be deposited on the solid catalyst in the column and it may become difficult to recover the polyvinyl acetal resin.

In the method of producing a polyvinyl acetal resin of the present invention 1, even when performing a reaction using a solid catalyst, a polyvinyl acetal resin having an acetalization degree of 70 mol % or more can be obtained. In accordance with the method of producing a polyvinyl acetal resin of the present invention, since it is possible to allow the reaction to proceed efficiently at a relatively low temperature, degradation of a resin such as the break of a primary chain hardly occurs and a polyvinyl acetal resin having a polymerization degree close to that of a polyvinyl alcohol resin used as a raw material can be produced.

A polyvinyl butyral resin, which is produced by the method of producing the polyvinyl acetal resin of the present invention, having a butyralization degree of 70 mol % or more, also constitutes the present invention.

When the butyralization degree is less than 70 mol %, the solubility in an organic solvent is deteriorated, and therefore, a handling property may be deteriorated in the applications of electronic materials. The butyralization degree is preferably 75 mol % or more and more preferably 80 mol % or more.

Incidentally, since an acetal group of the polyvinyl acetal resin is formed by acetalization of two hydroxyl groups of a polyalcohol resin to be a raw material, in this description, the acetalization degree (mol %) was determined by a method of counting the two acetalized hydroxyl groups.

In the method of producing an esterified polyvinyl alcohol resin of the present invention 2, a solution or a suspension containing a polyvinyl alcohol resin and a carboxylic acid compound is pressurized in the presence of a solid catalyst.

In the method of producing an esterified polyvinyl alcohol resin of the present invention 2, as for the polyvinyl alcohol resin and the solid catalyst, the same substances as in the method of producing a polyvinyl acetal resin of the present invention 1 can be used. As for a method of pressurizing the solution or the suspension containing a polyvinyl alcohol resin and a carboxylic acid compound, and the like, the same method as the method of producing a polyvinyl acetal resin of the present invention 1 can be used.

The above-mentioned carboxylic acid compound is not particularly limited, and examples of the compound include straight-chain, branched or cyclic saturated, unsaturated or aromatic carboxylic acid compounds having 1 to 19 carbon atoms. Such a carboxylic acid compound is not particularly limited, and includes, for example, formic acid, acetic acid, propionic acid, n-butyric acid, isobutyric acid, trimethylacetic acid, valeric acid, isovaleric acid, benzoic acid, cyclohexanecarboxylic acid and anhydrides thereof, acid halides, and the like. These carboxylic acid compounds may be used singly or in combination of two or more species. And, each of these carboxylic acid compounds may be one, of which one or more hydrogen atoms are replaced with halogen and the like.

In the method of producing an esterified polyvinyl alcohol resin of the present invention 2, even when performing a reaction using a solid catalyst, an esterified polyvinyl alcohol resin can be obtained at high efficiency. And, in accordance with the method of producing an esterified polyvinyl alcohol resin of the present invention 2, since it is possible to allow the reaction to proceed efficiently at a relatively low temperature, degradation of a resin such as the break of a primary chain hardly occurs and an esterified polyvinyl alcohol resin having a polymerization degree close to that of a polyvinyl alcohol resin used as a raw material can be produced.

EFFECT OF THE INVENTION

In accordance with the present invention, it is possible to provide a method of producing a polyvinyl acetal resin by which a polyvinyl acetal resin having a high acetalization degree can be produced even in a solid catalyst system, a polyvinyl butyral resin produced by the above-mentioned production method of a polyvinyl acetal resin, and a method of producing an esterified polyvinyl alcohol resin by which the esterification can be performed at high efficiency even in a solid catalyst system.

BEST MODE FOR CARRYING OUT THE INVENTION

Hereinafter, the present invention will be described in more detail by way of examples, but the present invention is not limited to these examples.

Example 1

To 44 g of a 10% by weight aqueous solution of a polyvinyl alcohol resin having a saponification degree of 99% and a polymerization degree of 500, 11 g of n-butylaldehyde of 99% in purity and 5.5 g of a polystyrenesulfonic acid type solid catalyst (produced by ORGANO CORPORATION, AMBERLYST 15JWET) were added and the resulting mixture was stirred for 5 minutes with a stirrer to obtain a mixed solution. Further, the concentration of hydrogen ion of the obtained mixed solution was measured to be $10^{-4}$ M.

The obtained mixed solution was placed in an autoclave apparatus (manufactured by TAIATSU TECHNO CORPORATION) and the autoclave apparatus was heated to 100° C. with a heater while sending a nitrogen gas until the internal pressure of the autoclave apparatus became 8 MPa using a pressure pump. After heating for 30 minutes, the autoclave apparatus was cooled to 80° C. and opened to release the pressure, and then a polyvinyl butyral resin was recovered with a spatula.

The obtained polyvinyl butyral resin was dissolved in dimethyl sulfoxide and this solution was precipitated in water three times, and the precipitate was dried well and then dissolved again in deuterated dimethyl sulfoxide and the butyralization degree was measured by $^1$H-NMR measurement to be 88 mol %.

And, the obtained polyvinyl butyral resin was dissolved in tetrahydrofuran to prepare a 0.2% by weight solution. Using gel permeation chromatography (manufactured by SHIMADZU CORPORATION, LC-10AT), measurement was carried out at a flow rate of 1 mL/min to determine a number average molecular weight and a weight average molecular weight. The polymerization degree was calculated from the obtained number average molecular weight and weight average molecular weight and the butyralization degree measured by $^1$H-NMR measurement, and consequently the polymerization degree of the obtained polyvinyl butyral resin was 500.

Comparative Example 1

To 44 g of a 10% by weight aqueous solution of a polyvinyl alcohol resin having a saponification degree of 99% and a polymerization degree of 500, 11 g of n-butylaldehyde of 99% in purity and 5.5 g of a polystyrenesulfonic acid type solid catalyst (produced by ORGANO CORPORATION, AMBERLYST 15JWET) were added and the resulting mixture was stirred for 5 minutes with a stirrer to obtain a mixed solution. Further, the concentration of hydrogen ion of the obtained mixed solution was measured to be $10^{-4}$ M.

The obtained mixed solution was placed in a three necked flask and the reaction of the mixed solution was conducted at 100° C. for 180 minutes while refluxing and the resulting polyvinyl butyral resin was recovered with a spatula.

The obtained polyvinyl butyral resin was dissolved in dimethyl sulfoxide and this solution was precipitated in water three times, and the precipitate was dried well and then dissolved again in deuterated dimethyl sulfoxide and a butyralization degree was measured by $^1$H-NMR measurement to be 50 mol %.

Example 2

To 44 g of a 10% by weight aqueous solution of a polyvinyl alcohol resin having a saponification degree of 99% and a polymerization degree of 500, 11 g of n-butanoic acid of 99% in purity and 5.5 g of a polystyrenesulfonic acid type solid catalyst (produced by ORGANO CORPORATION, AMBERLYST 15JWET) were added and the resulting mixture was stirred for 5 minutes with a stirrer to obtain a mixed solution.

The obtained mixed solution was placed in an autoclave apparatus (manufactured by TAIATSU TECHNO CORPORATION) and the autoclave apparatus was heated to 100° C. with a heater while sending a nitrogen gas until the internal pressure of the autoclave apparatus became 8 MPa using a pressure pump. After heating for 30 minutes, the autoclave apparatus was cooled to 80° C. and opened to release the pressure, and then an esterified polyvinyl alcohol resin was recovered with a spatula.

The obtained esterified polyvinyl alcohol resin was dissolved in dimethyl sulfoxide and this solution was precipitated in water three times, and the precipitate was dried well and then dissolved again in deuterated dimethyl sulfoxide and the esterification degree was measured by $^1$H-NMR measurement to be 10 mol %.

And, the obtained esterified polyvinyl alcohol resin was dissolved in tetrahydrofuran to prepare a 0.2% by weight solution. Using gel permeation chromatography (manufactured by SHIMADZU CORPORATION, LC-10AT), measurement was carried out at a flow rate of 1 mL/min to determine a number average molecular weight and a weight average molecular weight. The polymerization degree was calculated from the obtained number average molecular weight and weight average molecular weight and the esterification degree measured by $^1$H-NMR measurement, and consequently the polymerization degree of the obtained esterified polyvinyl alcohol resin was 500.

Comparative Example 2

To 44 g of a 10% by weight aqueous solution of a polyvinyl alcohol resin having a saponification degree of 99% and a polymerization degree of 500, 11 g of n-butanoic acid of 99% in purity and 5.5 g of a polystyrenesulfonic acid type solid catalyst (produced by ORGANO CORPORATION, AMBERLYST 15JWET) were added and the resulting mixture was stirred for 5 minutes with a stirrer to obtain a mixed solution.

The obtained mixed solution was placed in a three necked flask and the reaction of the mixed solution was conducted at 100° C. for 180 minutes while refluxing and the resulting esterified polyvinyl alcohol resin was recovered with a spatula.

The obtained esterified polyvinyl alcohol resin was dissolved in dimethyl sulfoxide and this solution was precipitated in water three times, and the precipitate was dried well and then dissolved again in deuterated dimethyl sulfoxide and the esterification degree was measured by $^1$H-NMR measurement to be 0.2 mol %.

INDUSTRIAL APPLICABILITY OF THE INVENTION

In accordance with the present invention, it is possible to provide a method of producing a polyvinyl acetal resin by which a polyvinyl acetal resin having a high acetalization degree can be produced even in a solid catalyst system, a polyvinyl butyral resin produced by the above-mentioned production method of a polyvinyl acetal resin, and a method of producing an esterified polyvinyl alcohol resin by which the esterification can be performed at high efficiency even in a solid catalyst system.

The invention claimed is:
1. A method of producing a polyvinyl acetal resin,
   wherein a solution or a suspension containing a polyvinyl alcohol resin and a carbonyl compound is pressurized to 0.5 MPa or more in the presence of a solid catalyst, wherein the solid catalyst is selected from the group consisting of acid silica, acid alumina, acid zirconia, zeolite, acid ion resin in which a carboxyl group or a sulfonic acid group is introduced, and acid resin in which a carboxyl group is introduced.

2. The method of producing a polyvinyl acetal resin according to claim 1,
wherein the solution or the suspension containing a polyvinyl alcohol resin and a carbonyl compound is pressurized using the solution or the suspension containing a polyvinyl alcohol resin and a carbonyl compound.

3. The method of producing a polyvinyl acetal resin according to claim 1,
wherein the solution or the suspension containing a polyvinyl alcohol resin and a carbonyl compound is pressurized using at least one species selected from the group consisting of nitrogen, oxygen, nitrogen oxide, carbon dioxide, helium, argon, neon, water and air.

4. The method of producing a polyvinyl acetal resin according to claim 1,
wherein the hydrogen ion concentration of the solution or the suspension containing a polyvinyl alcohol resin and a carbonyl compound is $10^{-6}$ to $10^{-3}$ M.

5. The method of producing a polyvinyl acetal resin according to claim 1,
wherein the carbonyl compound is an aldehyde compound and/or a ketone compound.

6. The method of producing a polyvinyl acetal resin according to claim 1,
wherein the solution or the suspension containing a polyvinyl alcohol resin and a carbonyl compound is pressurized at a temperature of 0 to 250° C.

7. The method of producing a polyvinyl acetal resin according to claim 1, wherein the carbonyl compound is n-butyraldehyde.

8. A method of producing an esterified polyvinyl alcohol resin,
wherein a solution or a suspension containing a polyvinyl alcohol resin and a carboxylic acid compound is pressurized to 0.5 MPa or more in the presence of a solid catalyst,
wherein the solid catalyst is selected from the group consisting of acid silica, acid alumina, acid zirconia, zeolite, acid ion resin in which a carboxyl group or a sulfonic acid group is introduced, and acid resin in which a carboxyl group is introduced.

9. The method of producing an esterified polyvinyl alcohol resin according to claim 8,
wherein the solution or the suspension containing a polyvinyl alcohol resin and a carboxylic acid compound is pressurized using the solution or the suspension containing a polyvinyl alcohol resin and a carboxylic acid compound.

10. The method of producing an esterified polyvinyl alcohol resin according to claim 8,
wherein the solution or the suspension containing a polyvinyl alcohol resin and a carboxylic acid compound is pressurized using at least one species selected from the group consisting of nitrogen, oxygen, nitrogen oxide, carbon dioxide, helium, argon, neon, water and air.

11. The method of producing an esterified polyvinyl alcohol resin according to claim 8,
wherein the solution or the suspension containing a polyvinyl alcohol resin and a carboxylic acid compound is pressurized at a temperature of 0 to 250° C.

* * * * *